United States Patent [19]
Olmsted

[11] 3,949,779
[45] Apr. 13, 1976

[54] FLOW SHUT OFF VALVE

[75] Inventor: Peter B. Olmsted, Traverse City, Mich.

[73] Assignee: Olmsted Products Co., Traverse City, Mich.

[22] Filed: Dec. 30, 1974

[21] Appl. No.: 537,175

[52] U.S. Cl. ............................................. 137/493
[51] Int. Cl.² .......................................... F16K 17/22
[58] Field of Search ......................... 137/493, 493.7

[56] References Cited
UNITED STATES PATENTS

| | | | |
|---|---|---|---|
| 2,989,072 | 6/1961 | Banker .......................... | 137/493 UX |
| 3,044,485 | 7/1962 | Adams et al. .................... | 137/493.7 |
| 3,770,007 | 11/1973 | Orth et al. ...................... | 137/493 |

*Primary Examiner*—Henry T. Klinksiek
*Attorney, Agent, or Firm*—James M. Deimen

[57] ABSTRACT

An improved exerciseable emergency flow shut off device for fluid control systems particularly adapted for use in adverse marine environments. In normal operation the valve spool is continuously exercised by a reversing fluid pressure differential as fluid reversibly flow through the valve. The improved valve includes low breakaway force spool biasing means to reduce the internal fluid resistance of the valve in normal operation and high breakaway force restraining means connected to the shut off means. In the preferred embodiment the spool biasing means and restraining means comprise separate coil springs concentrically located on the spool, the biasing means having a spring rate substantially lower than the restraining means. The biasing coil is reciprocateably compressed in response to the reversing fluid pressure differentials thus minimizing flow resistance. The restraining means is compressed in response to a sudden excess pressure differential thereby permitting shut off of the valve. Unactuated, the restraining means reciprocates with the spool to assure operability in event of emergency.

25 Claims, 3 Drawing Figures

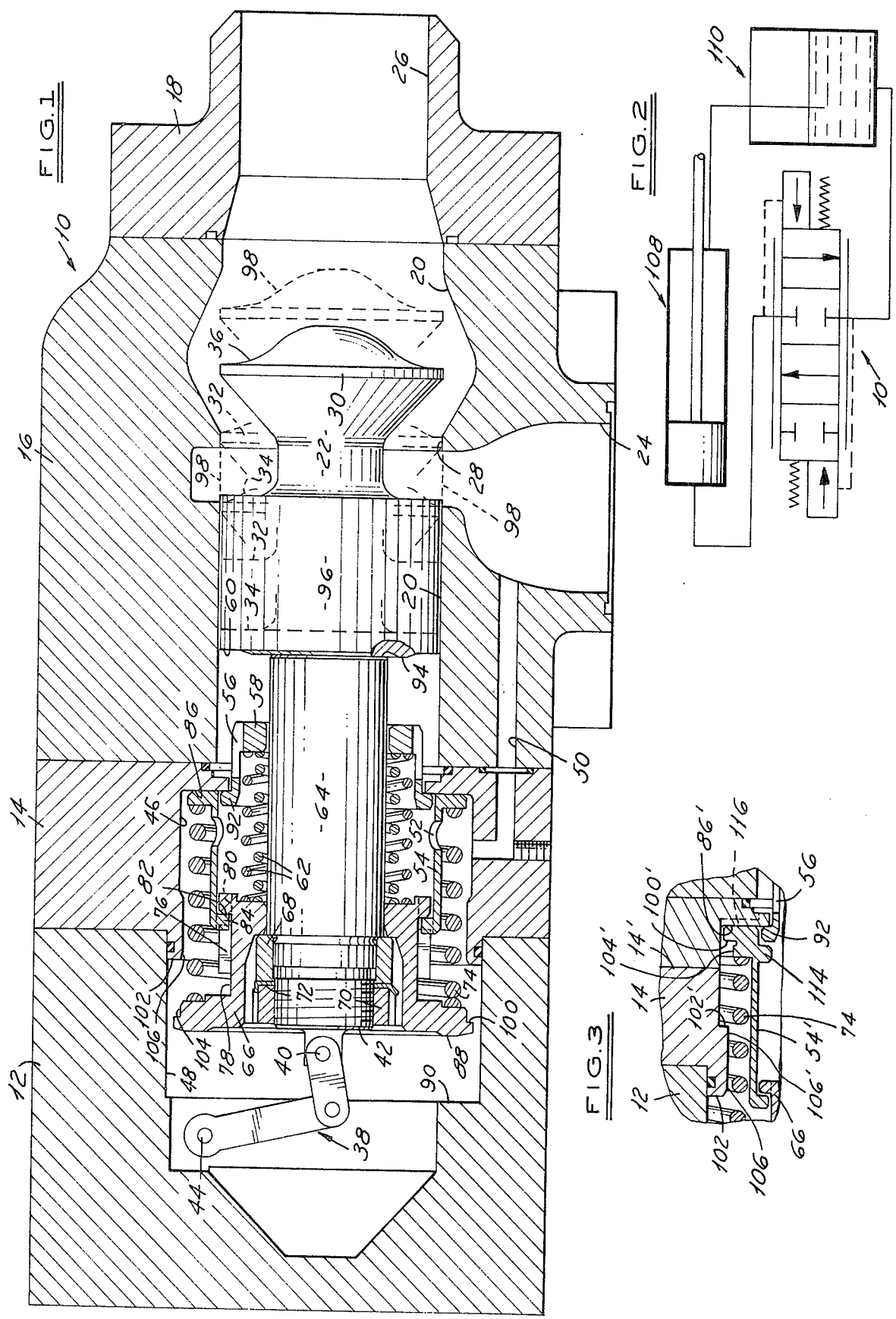

FLOW SHUT OFF VALVE

BACKGROUND OF THE INVENTION

Reference is hereby made to copending U.S. patent application Ser. No. 513,216 filed Oct. 9, 1974 by Peter B. Olmsted for a Flow Shut Off Valve.

Shipboard fluid control systems are subjected to a severe corrosive environment. Flow shut off valves used as protective devices on board offshore drill ships are particularly subject to the adverse environment and must be operable under sudden emergency conditions. Such a valve is disclosed in the application referred to above and includes means to exercise the valve under normal operating conditions thereby assuring operability of the valve under emergency conditions. The combined biasing and restraining means utilized to reciprocate the spool in normal operation causes internal resistance to the flow of fluid as a result of transient interruptions to flow as the spool cycles through the neutral position. The disclosures below comprise improvements to such exerciseable flow shut off valves resulting in substantially lower internal fluid resistance and smoother cyclic movement of the spool.

SUMMARY OF THE INVENTION

The invention comprises improvements to exerciseable emergency flow shut off valves used in fluid control systems. Low breakaway force spool biasing means and separately actuateable high breakaway force restraining means connected to the shut off means are provided to reduce the internal flow resistance during normal cyclic reversals of flow through the valve. The biasing means permits a relatively small pressure differential across the valve to move the valve spool from the neutral position. The decreased internal resistance of the valve reduces the severity of the transient interruptions in the flow as the spool reciprocates through the neutral position in normal operation. The separately actuateable restraining means controls the actuation of the shut off means and is exercised by the cyclic movement of the spool. However, the exercise of the restraining means does not substantially add to the internal flow resistance of the valve in normal operation. A sudden excess pressure differential across the valve exceeding the breakaway force of the restraining means causes actuation of the shut off means and the valve closes. Such a sudden excess pressure differential results from a sudden substantial increase in volumetric fluid flow through the valve.

DESCRIPTION OF THE DRAWINGS

FIG. 1 is a longitudinal cross section of an exerciseable valve embodying the invention;

FIG. 2 is a schematic fluid circuit incorporating the valve of FIG. 1; and,

FIG. 3 is a partial cutaway section showing an alternate embodiment of the valve.

DESCRIPTION OF THE PREFERRED EMBODIMENT

In FIG. 1 the valve generally denoted by 10 includes a cap 12, sandwich plate 14, body 16 and port fitting 18. The body 16 includes a central chamber 20 having a spool 22 reciprocateable axially therein. A port 24 in the body 16 communicates with the chamber 20 as does a port 26 in the port fitting 18. The ports 24 and 26 communicate with chamber 20 on opposite sides of a neutral location 28 in the chamber 20. The spool 22 includes a flange 30 adapted to substantially prevent fluid communication between ports 24 and 26 when the spool 22 moves leftwardly to the position shown ghosted at 32. Further movement to the left to the position shown ghosted at 34 again permits fluid communication between ports 24 and 26. The spool 22 reciprocates between the solid line position denoted as 36 and ghosted position 34 in response to a reversing fluid pressure differential across ports 24 and 26. Such a pressure differential results from a reversing flow of fluid through the valve which in turn may be caused by the vertical motion of an off shore drill ship as it rises and falls on ocean swells. The reciprocating movement of the spool 22 between the normal right most position 36 and left motion position 34 continuously exercises the spool 22 and mechanism thereattached and described below, thus assuring operability of the valve in the event of emergency.

Mechanical indicator means generally denoted by 38 are attached at 40 to the end 42 of the spool 22. A shaft 44 extends through the cap 12 to external indicator means (not shown) which allows continuous visual monitoring of the movement of the spool. Reference is hereby made to the copending patent application noted above for a full explanation of the indicator mechanism. Other mechanical or electronic means of externally monitoring spool movement or position can be easily envisioned.

The chamber 20 extends into an enlarged portion 46 in the sandwich plate 14 and a further enlarged portion 48 in the cap 12. The enlarged portions 46 and 48 are in fluid communication with port 24 through the passage 50. Passages 52 in outer spring retainer 54 and passages 56 in inner spring retainer 58 assure fluid communication with the annular spool shoulder 60.

Dual concentric biasing coil springs 62 are mounted on the spool extension 64 and located between the inner spring retainer 58 and the end retainer 66. The end retainer 66 is retained on the extension 64 by a collar 68 and threaded lock nut 70 having locking means 72 as shown. The end retainer 66 and the outer spring retainer 54 engage a restraining concentric coil spring 74 having a spring rate in excess of the spring rate of the biasing springs 62. To permit assembly the end retainer 66 includes a plurality of slots 76 axially extending into an annular groove 78. Alternating slots 80 extend from groove 78 through the right most end of the end retainer 66. The slots 76 are terminated at 82. The left most end of the outer spring retainer 54 includes inwardly extending teeth 84 adapted to be slid axially through alternating slots 80 to the groove 78 as the restraining coil spring 74 is tightly compressed. The outer spring retainer 54 is then rotated relative to the end retainer 66 to align the teeth 84 with slots 76 and released to allow engagement at 82. With teeth 84 engaged at 82 the restraining coil spring 74 is compressed to the high breakaway force specified by the requirements of the valve. As the spool reciprocates between positions 36 and 34, the restraining coil spring 74 and retainers 66 and 54 reciprocate as a unit between the position denoted 36 with the retainer 54 in contact with the shoulder 86 and a left most position 34 with the annular protrusion 88 on the retainer 66 in contact with the substantially annular shoulder 90 in the cap 12. Contact at 88 and 90 occurs as the spool flange 30 passes the neutral position 32 in moving to the left. However, negligible compression or expansion of spring 74 occurs during normal spool reciprocation because spacer 68 is caused to disengage end retainer 66 by the leftward movement of extension 64 allowing spool 22 to move to position 34.

Biasing coil springs 62 are compressed by the end retainer 66 and inner spring retainer 58. Inner spring retainer 58 includes an annular flange 92 which engages the shoulder 86 whenever the spool 22 is to the right of the neutral position 32. Movement to the left from position 36 brings the annular protrusion 94 into contact with inner spring retainer 58 as the neutral position is passed. Further movement to the left causes the biasing springs 62 to again be compressed and the flange 92 to disengage the shoulder 86 as position 34 is approached. Thus, the biasing springs 62 reach maximum expansion when the spool 22 is in the neutral position 32 thereby biasing the spool 22 to the neutral position.

The valve of FIG. 1 includes a shut off land 96 adapted to close port 24 upon an excess sudden pressure differential across the valve as a result of excess flow through the valve relative to the normal reversing flows. The valve of this embodiment is capable of shut off only with a high pressure at port 24 relative to port 26, however the features of this invention are equally applicable to the double shut off land valve disclosed in the above noted copending application. Modification for such a double shut off land valve is disclosed below with reference to FIG. 3. The sudden excess pressure differential transmitted through passage 50 causes the spool 22 to be driven forcefully rightward beyond position 36 to the position shown ghosted at 98. Land 96 is thereby caused to close port 24 and restraining coil spring 74 is compressed by end retainer 66 until annular lip 100 engages the shoulder lip 102 of sandwich plate 14. Biasing coil springs 62 are simultaneously further compressed, however the substantially stepwise sudden increase in force required to compress the restraining spring 74 determines the level of sudden excess pressure differential required to shut off the valve. Annular fluid throttling means to cushion the final portion of the shut off stroke is provided by the annular gap occurring between surface 104 on end retainer 66 and surface 106 adjacent shoulder lip 102.

The biasing springs 62 need be installed with a spring rate only sufficient to urge the spool 22 to the neutral position in response to a lack of pressure differential. The spool 22 is opened from neutral position 32 with a minimum pressure differential requirement thereby reducing the transient pulses in the fluid system as the spool reciprocates through the neutral position. As an example, a valve having a four inch diameter at 28 utilizes biasing springs 62 compressed to a biasing breakaway force of 120 pounds at the neutral position and a restraining spring 74 compressed to a breakaway force of 700 pounds for shut off. This valve opens from the neutral position with a fluid pressure differential of about ten psi. Emergency shut off requires a fluid pressure differential in excess of fifty five psi. Thus in normal operation the reversing pressure differentials may range to above fifty psi.

A typical installation is shown by the schematic of FIG. 2. The installation includes a hyraulic cylinder and piston denoted by 108, a gas pressurized accumulator 110 and the valve 10. The accumulator 110 may be pressurized by gas bottles (not shown). The installation is suitable for controlling riser support cables as in the above noted copending application. The valve 10 with the single shut off land 96 is installed to prevent fluid flow from the accumulator in event of emergency thereby retaining stored fluid potential energy in the accumulator at a pressure high relative to cylinder pressure. The uncontrolled release of fluid energy from the accumulator is thereby prevented. The valve 10 remains shut off until the excess pressure differential is relieved by other means (not shown) in a controlled manner.

In FIG. 3 an alternate embodiment is disclosed suitable for inclusion in a valve having twin shut off lands such as disclosed in the preferred embodiment of the application referred to above. Modified parts are indicated by primed reference numbers. The operation of the modified valve with normal reversing fluid flow is as described above. In event of an excess pressure differential causing a leftward shut off movement, the annular flange 92 engages the annular internal flange 114 thereby causing outer spring retainer 54' to move leftward relative to end retainer 66 compressing restraining coil 74 until annular lip 100' on retainer 54' engages shoulder lip 102'. To facilitate assembly of the modified construction, sandwich plate 14 is split at 14'. Annular fluid throttling means to cushion the final portion of the shut off stroke is provided by the annular gap occurring between surface 104' on the outer spring retainer 54' and surface 106' adjacent shoulder lip 102'. The passage holes 52 in retainer 54 are eliminated in favor of radial slots 116 in shoulder 86' thus preventing fluid escape when cushioning between surfaces 104' and 106' occurs upon shut off. Rightward emergency shut off movement remains as described with reference to FIG. 1.

What is claimed is:

1. Fluid control means comprising a valve body having a chamber therein, exerciseable means in the chamber, means biasing the exerciseable means to a neutral position, external fluid port means communicating with the chamber on one side of the neutral position and second external port means communicating with the chamber on the opposite side of the neutral position, the exerciseable means constrained to reciprocate about the neutral position in response to reversing fluid pressure differentials occurring between the ports;
   and characerized by,
   separately actuateable shut off means adapted to prevent the flow of fluid through the fluid control means in response to a fluid pressure differential in excess of the reversing fluid pressure differentials.

2. The fluid control means of claim 1 wherein the shut off means include restraining means reciprocateable in unactuated condition in response to reciprocation of the exerciseable means.

3. The fluid control means of claim 2 wherein the biasing means include spring means.

4. The fluid control means of claim 3 wherein the restraining means include spring means having a spring rate substantially in excess of the biasing means spring rate.

5. The fluid control means of claim 2 wherein the restraining means include spring means.

6. The fluid control means of claim 1 including means to prevent fluid communication therethrough when the exerciseable means is in the neutral position.

7. The fluid control means of claim 1 wherein the shut off means include cushioning means to prevent damage to the fluid control means in event of shut off.

8. The fluid control means of claim 1 including external indicator means adapted to monitor movement of the exerciseable means.

9. Fluid control means comprising a body, a chamber in the body, at least two external ports communicating with the chamber, a spool in the chamber constrained to reciprocate about a neutral position in response to reversing fluid pressure differentials occurring between the two ports, biasing means adapted to urge the spool to the neutral position, and a shut off land on the spool positionable to prevent fluid communication between the two ports in response to a fluid pressure differential in excess of the reversing fluid pressure differentials, and characterized by, separately actuateable restraining means adapted to permit positioning of the shut off land to prevent fluid communication between the two ports in response to the excess pressure differential.

10. The fluid control means of claim 9 wherein the biasing means include spring means.

11. The fluid control means of claim 10 wherein the restraining means include spring means having a spring rate substantially in excess of the biasing means spring rate.

12. The fluid control means of claim 9 wherein the restraining means include spring means.

13. The fluid control means of claim 9 wherein the restraining means are reciprocateable in unactuated condition in response to reciprocation of the exerciseable means.

14. The fluid control means of claim 9 including means to prevent fluid communication between the ports when the spool is in the neutral position.

15. The fluid control means of claim 9 including cushioning means actuated upon shut off positioning of the land to prevent damage to the fluid control means.

16. The fluid control means of claim 15 wherein the cushioning means comprise fluid throttling means.

17. The fluid control means of claim 9 including external indicator means adapted to monitor movement of the spool.

18. The fluid control means of claim 17 wherein the indicator means include a mechanical linkage connected to the spool and extending exteriorly of the body.

19. The fluid control means of claim 9 wherein the biasing means and restraining means each include spring means, the spring rate of the restraining means being in excess of the spring rate of the biasing means.

20. The fluid control means of claim 19 wherein the spring rate for shut off positioning of the land equals the sum of the spring rates for the biasing means and the restraining means.

21. The fluid control means of claim 9 wherein the biasing means include at least one coil spring mounted on the spool and the restraining means include at least one coil spring mounted on the spool, the spring rate of the restraining means in excess of the spring rate of the biasing means with the spring rate for shut off positioning of the land equal to the sum of the spring rates.

22. A fluid control system comprising a fluid cylinder and piston therein, fluid control means comprising a valve body having a chamber therein, exerciseable means in the chamber biased to a neutral position, external port means in fluid communication with the cylinder and with the chamber on one side of the neutral position, second external port means communicating with the chamber on the opposite side of the neutral position, the exerciseable means constrained to reciprocate about the neutral position in response to reciprocation of the piston;

and characterized by, separately actuateable shut off means in the fluid control means adapted to prevent the flow of fluid through the fluid control means in response to a sudden excess volumetric flow through the fluid control means.

23. The fluid control system of claim 22 including fluid accumulator means in communication with the second external port means, the reciprocation of the exerciseable means permitting reversible fluid flow between the cylinder and accumulator.

24. The fluid control system of claim 23 wherein the shut off means are adapted to prevent fluid flow from the accumulator to the cylinder in response to a sudden excess volumetric flow through the fluid control means.

25. The fluid control system of claim 22 wherein the exerciseable means include means to prevent fluid flow through the fluid control means with the exerciseable means in the neutral position.

* * * * *